(12) United States Patent
Van de Sluis et al.

(10) Patent No.: US 8,171,016 B2
(45) Date of Patent: May 1, 2012

(54) SYSTEM AND METHOD FOR USING CONTENT FEATURES AND METADATA OF DIGITAL IMAGES TO FIND RELATED AUDIO ACCOMPANIMENT

(75) Inventors: Bartel Marinus Van de Sluis, Eindhoven (NL); Wilhelmus Franciscus Johannes Fontijn, Eindhoven (NL); Mark Verberkt, Eindhoven (NL); Koen Hendrik Johan Vrielink, Eindhoven (NL); Albert M. A. Rijckaert, Waalre (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 549 days.

(21) Appl. No.: 12/094,170

(22) PCT Filed: Nov. 15, 2006

(86) PCT No.: PCT/IB2006/054281
§ 371 (c)(1),
(2), (4) Date: May 19, 2008

(87) PCT Pub. No.: WO2007/057850
PCT Pub. Date: May 24, 2007

(65) Prior Publication Data
US 2008/0256100 A1  Oct. 16, 2008

Related U.S. Application Data

(60) Provisional application No. 60/738,497, filed on Nov. 21, 2005.

(51) Int. Cl.
*G06F 7/10* (2006.01)
*G06F 17/30* (2006.01)

(52) U.S. Cl. ......... 707/715; 707/713; 707/723; 707/749

(58) Field of Classification Search ........... 707/3, 104.1, 707/999.003, 999.104, 713, 715, 102, 999.102, 707/999.107, 749, 999.1, 723, 728; 348/231.4; 353/15; 715/723
See application file for complete search history.

(56) References Cited

U.S. PATENT DOCUMENTS
6,404,925 B1 *  6/2002  Foote et al. .................... 382/224
(Continued)

FOREIGN PATENT DOCUMENTS
EP    1209589 A2   5/2002
(Continued)

OTHER PUBLICATIONS http//www.scatteredpictures.com/Scattered/sphowto.html, "Scattered Pictures Video Photo Album", created Mar. 22, 2005.

*Primary Examiner* — James Trujillo
*Assistant Examiner* — Bruce Moser

(57) ABSTRACT

A system (300), apparatus (200) and method (100) are provided to automatically play/suggest at least one audio accompaniment while a sequence of at least one digital image is being displayed such that the audio accompaniment matches the content of the particular sequence of images and matches any provided and/or generated image metadata. Search terms are derived from the images themselves as well as any metadata provided by the user and these search terms are then used to find audio accompaniment that either (1) contains these search terms or synonyms thereof in the image or associated text (e.g., song text) or (2) represents the sound normally associated with the images, such as rushing water sound for an image of a fast flowing brook. The invention accepts user input, locates appropriate audio accompaniment as search results and presents these results to the user either by playing the audio accompaniment while displaying the images or by suggesting a playlist to the user compiled from these results.

16 Claims, 3 Drawing Sheets

U.S. PATENT DOCUMENTS

| | | |
|---|---|---|
| 7,548,934 B1 * | 6/2009 | Platt et al. ............................. 1/1 |
| 2003/0065503 A1 * | 4/2003 | Agnihotri et al. ................. 704/7 |
| 2003/0072562 A1 | 4/2003 | Vau et al. |
| 2004/0095379 A1 | 5/2004 | Chang et al. |
| 2004/0100487 A1 * | 5/2004 | Mori et al. .................... 345/724 |
| 2004/0223747 A1 | 11/2004 | Otala et al. |
| 2005/0057578 A1 | 3/2005 | Chen et al. |
| 2005/0158037 A1 | 7/2005 | Okabayashi et al. |
| 2005/0160067 A1 | 7/2005 | Sohma et al. |
| 2005/0225643 A1 | 10/2005 | Grignani |

FOREIGN PATENT DOCUMENTS

| | | |
|---|---|---|
| WO | 2005011258 A1 | 2/2005 |
| WO | 2007004139 A2 | 1/2007 |

* cited by examiner

SYSTEM AND METHOD FOR USING CONTENT FEATURES AND METADATA OF DIGITAL IMAGES TO FIND RELATED AUDIO ACCOMPANIMENT

The present invention relates to using metadata of a sequence of digital images in order to identify and associate therewith an audio accompaniment including music and sound having text and metadata that is similar to the image metadata and to create a sequence combined with the identified audio for presentation to a user as a suggested playlist or as a sight and sound show.

More and more consumer systems combine the storage and playback of various types of content. As a result, a system that a person uses to play back digital photos will often also be able to play musical accompaniment while displaying these photos. The problem is that this possibility introduces an extra task for the user, namely to find and select the appropriate music to accompany a photo slideshow (sequence of digital images). Therefore, a way is needed to automatically play (or suggest) audio accompaniment that matches the content of a particular sequence of digital images.

In an embodiment, the system, apparatus and method of the present invention provides a way to employ the metadata of digital images (such as photos, photo albums, home videos) to search for music, which contains song text that is related to these photos.

In order to achieve this:

(1) textual labels are derived from the (set/sequence of) image(s) or from image metadata, and (2) these textual labels or keyphrases comprise at least one keyword and are used to find audio accompaniment that contains these keyphrases in a music title or in (prominent) parts of a song text associated with the music or in metadata of the audio.

Many classical pieces have had words set to their music, e.g., "I'm Always Chasing Rainbows" is a song set to Chopin's Fantasie Impromptu. Further, many pieces of music that have no words are appropriate as background music for slideshows, e.g., a seaside slideshow associated with ocean music. In addition to music, sound tracks are provided as audio accompaniment. These latter audio accompaniments have to have associated metadata describing their content.

Figure 1:
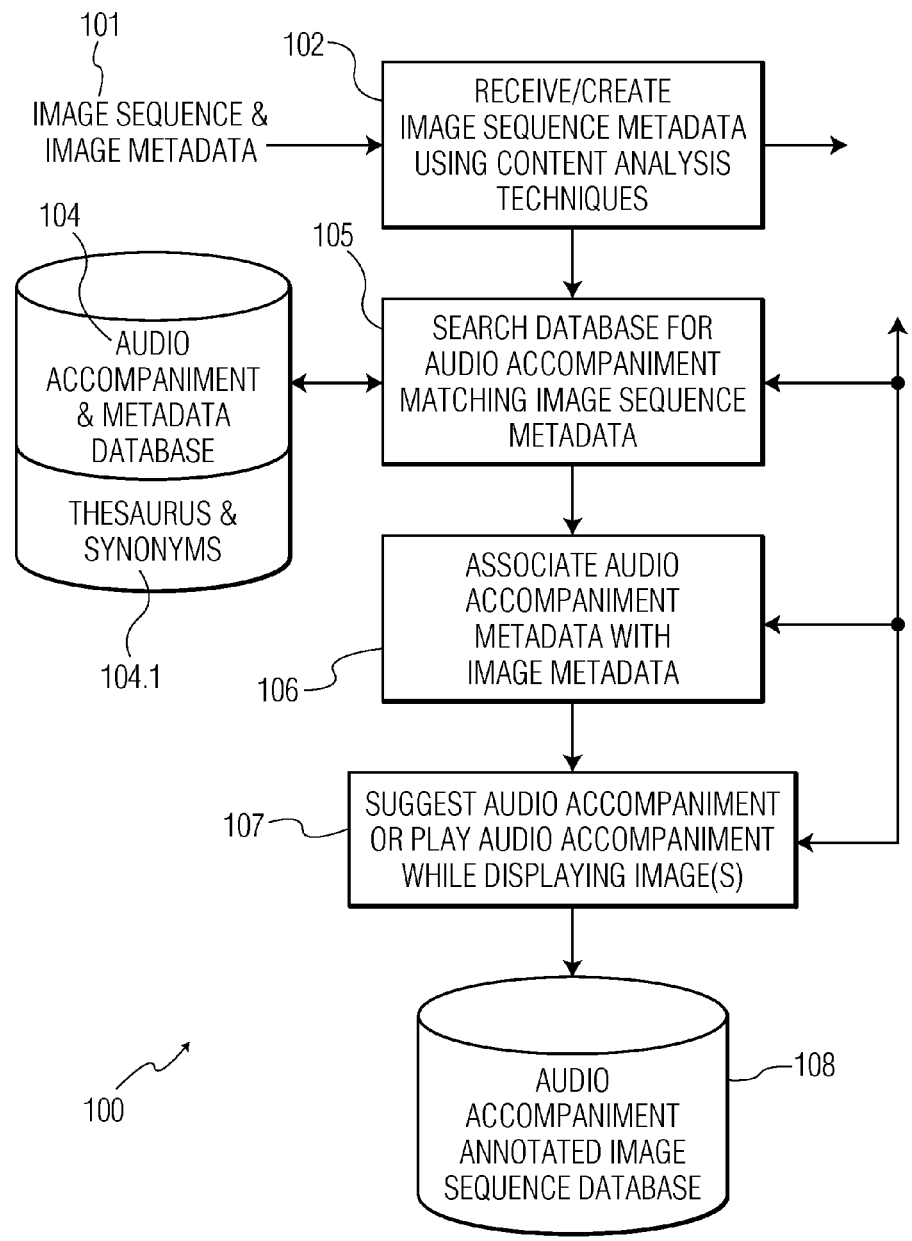
FIG. 1 illustrates a functional flow diagram of a method according to the present invention.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the present invention.

In a preferred embodiment, digital image content and characteristics provided by a user are used to derive textual labels (image metadata) which can be a keyphrase comprising at least one keyword derived from a user-specified image name/label or keyphrase derived from a textual annotation of the image. In a preferred embodiment, the contents of a sequence of images is recognized using optical character recognition (OCR) for text content, image scene recognition for scenes and image object recognition for objects (including people and animals). The image characteristics supplied by the user are treated as image metadata and can include such items as user-specific data (e.g., ethnicity, sex, age, occupation), a time-of-creation and a place-of-creation information for the image(s), which are converted into meaningful names or into keyphrases comprising standardized keywords and describing a most likely event taking place and a location (e.g. birthday, Christmas, New York, Paris, summer holiday, . . . ).

In an embodiment, image content analysis algorithms are used to classify the scenery of images and provide metadata describing images that can be used as search terms for searching a database of keyphrase-indexed audio accompaniments. Words or labels associated with such a class are also used to derive textual labels (image metadata) which are then used to find related audio content. For instance, it is possible to detect a winter scene from its overall whiteness. The identification of such a characteristic is converted into certain textual metadata (label), such as winter, snow, white. These metadata can then be used to find audio having song texts and audio metadata about winter, snow etc.

In a preferred embodiment, the metadata for an image is combined. For instance, the time information can be converted into "Christmas" whereas the scene analysis information yields (among other words) "White". The present invention finds the song "White Christmas" in this example and the sound of falling snow.

In a preferred embodiment, the selected audio accompaniment is extended in time to cover a sequence of images because it is generally not desirable for such a sequence to skip to another audio accompaniment for each of the constituent images. Therefore, it is advantageous to aggregate the metadata available for a sequence of images into a description for the whole sequence. Then, using the aggregated metadata, at least one audio accompaniment can be chosen that is suitable for the whole sequence of images.

In a further alternative embodiment, conversion of metadata into meaningful textual labels is improved by having available information about the user (e.g. geographical home location for providing the appropriate level of location granularity, region/cultural background for deriving the right events, personal/family information for determining holidays, etc).

In a preferred embodiment, sound effects are provided as audio accompaniment that is related to the metadata of the image(s). For instance, a slide show of a party may be laced with the sound of glasses. A picture of a crowd may trigger a murmuring sound.

Referring now to FIG. 1, one example of a flow diagram for a preferred embodiment of a method according to the present invention is illustrated. At step 102, an image or a sequence of images 101 is input along with associated metadata 101 which metadata is at least one of received and created for at least one image and the image and metadata is then retained in a short-term persistent memory 103. The image metadata can be input by the user or can be derived by the present invention and can include: date, time, event, location, relationship of image to user, or other descriptor. The system, apparatus and method of the present invention can include a thesaurus of terms and their synonyms 104.1 used to normalize any metadata input by the user to a standard set, e.g., mom, mother, ma, mama, madre, etc., all refer to a same "mother" characteristic of an image. Similarly, the method 100 of the present invention can include image analysis capabilities for the creation of image metadata, e.g., a white winter scene. Both types of metadata comprising user input metadata and system created metadata are stored in a persistent memory 103 along with the image sequence and at least one type must be stored for the system 300, apparatus 200 and method 100 of the present invention to locate corresponding audio accompaniment for an input image sequence.

An audio accompaniment database 104 is provided that has been previously annotated (indexed) with standardized audio accompaniment metadata. Using the standardized captured/created image metadata retained in the short-term persistent memory 103, at step 105 the provided music database 104 is searched for matching music metadata. At step 106, all matching music metadata is compiled into a play list, associated with the image(s) and retained in the persistent memory 103. In a preferred embodiment, a degree of match is also derived, e.g., a winter and white image and user provided date of December 25 would lead to a 100% match with "White Christmas" and a lesser match with "Walking In A Winter Wonderland". At step 107, search results are retrieved from the persistent memory 103 and the best match is one of played or presented in a ranked list of musical accompaniment suggestions while the images are displayed. In a preferred embodiment both the images and audio annotations are stored in a database 108 for later retrieval, display and play.

Figure 2:
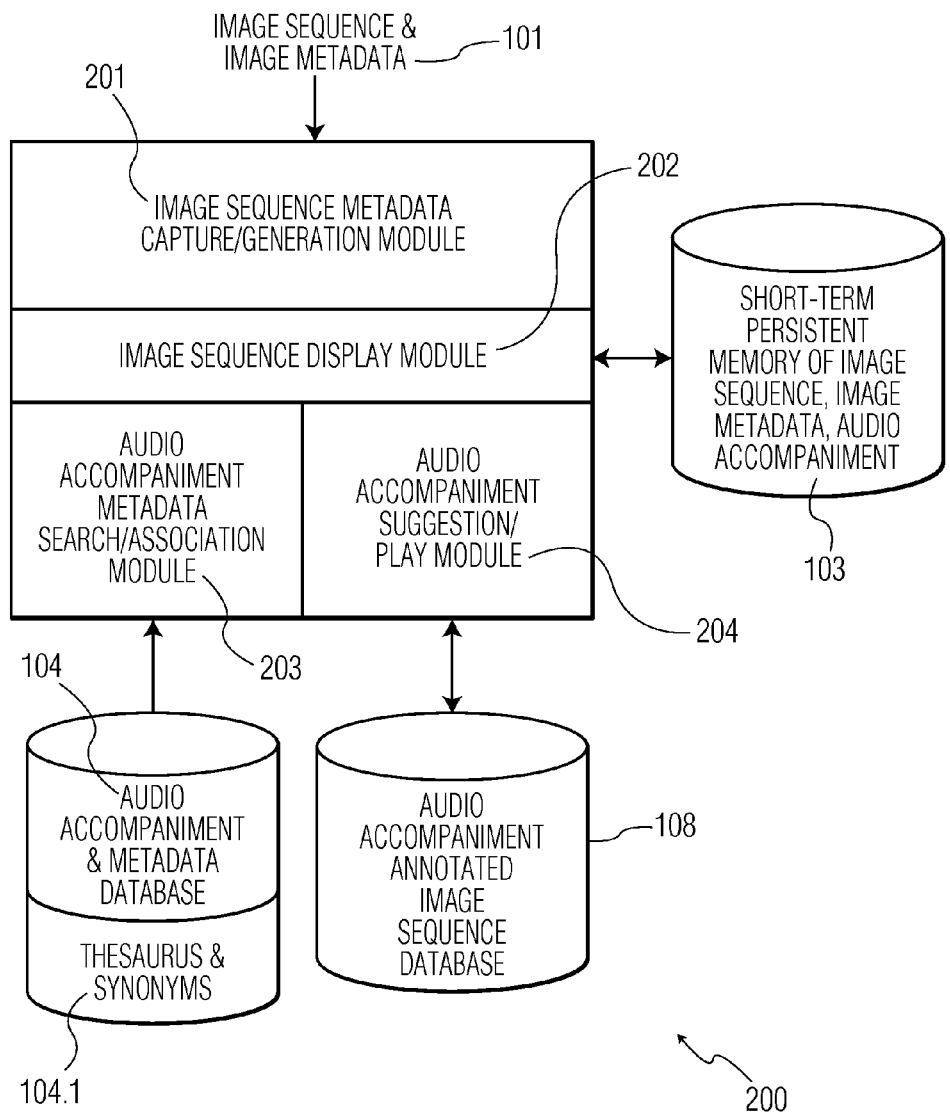
FIG. 2 illustrates an apparatus according to the present invention for associating music with songs.

Referring now to FIG. 2, an apparatus 200 is illustrated for associating audio accompaniments with images while the images are being displayed or for presenting a playlist of audio accompaniments to the user. The apparatus comprises an image metadata capture/creation module 201 that receives an image, an image sequence, and metadata describing the image and the image sequence. The metadata comprises date, time, season, event, relationship to user, name(s) of individual(s)/pet(s), location of the image and image sequence. The metadata input by the user is captured by the module 201 as well as being created by the module 201 through image analysis, e.g., ocean or lake, islands, etc. Once an image and its metadata have been captured and metadata for an input image sequence has been created by the module 201, it is retained in a short-term persistent memory 103. Then a search/association module 203 searches a database 102 for suitable audio accompaniments based on the metadata and a suggestion/play module 204 at least one of suggests a playlist or plays a most relevant audio accompaniment resulting from the search. In a preferred embodiment, the results are saved in a database of annotated images 108 for future retrieval and playing. The persistent memory 103 is a relatively short term memory, lasting only as long as the user desires the display device that incorporates the apparatus 200 to display an image sequence.

Figure 3:
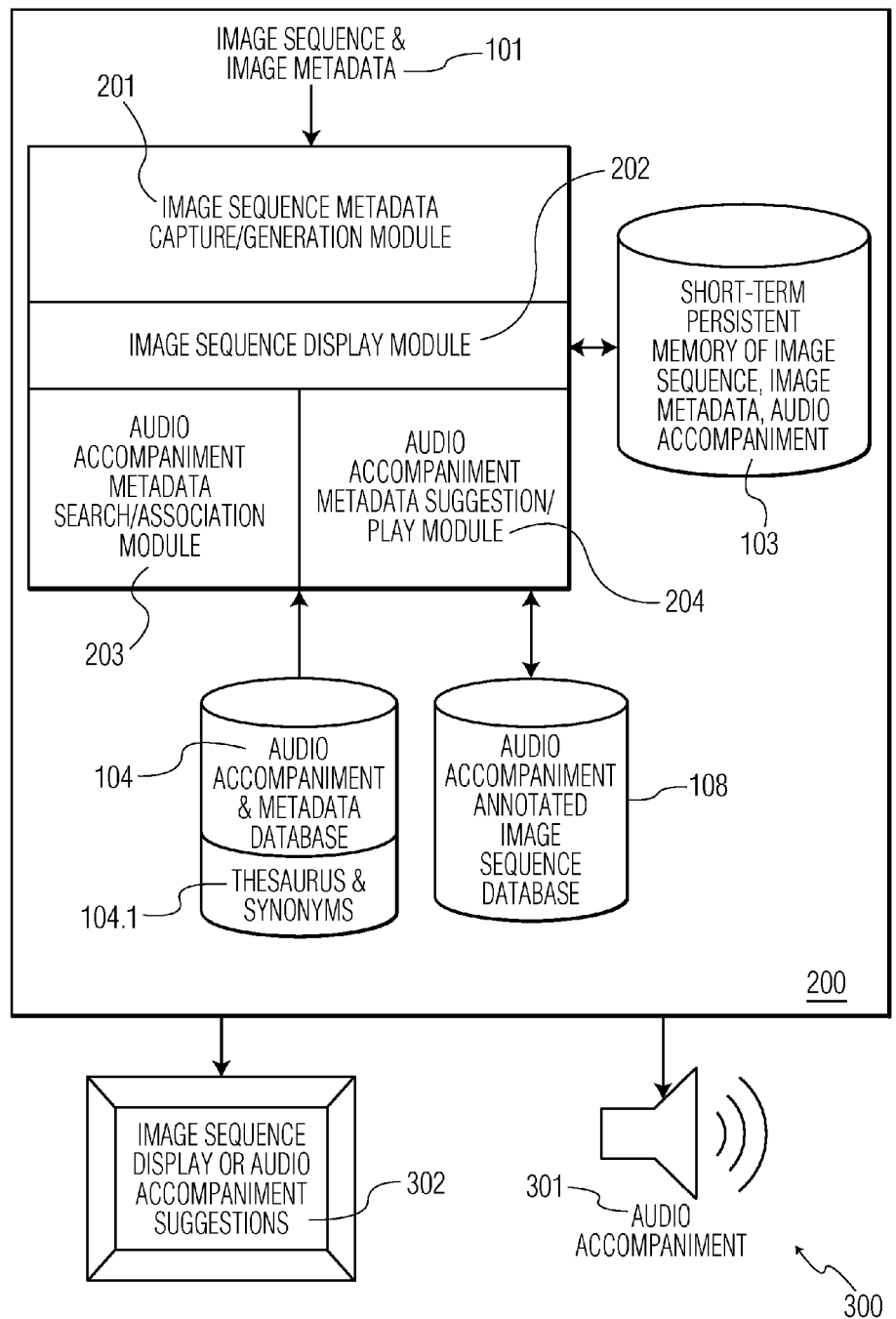
FIG. 3 illustrates a system according to the present invention.

Referring now to FIG. 3, a system 300 is illustrated incorporating the apparatus 200 of FIG. 2. The system 300 accepts digital image content and metadata therefore input by a user 101, and using the apparatus 200 of FIG. 2 creates additional image metadata, if necessary, with the help of a thesauri 104.1 to locate appropriate audio accompaniment in a database 104 thereof and storing resulting audio accompaniment associated with the input sequence in a short-term persistent memory 103. The system then either plays 301 the audio accompaniment while displaying 302 the image/sequence or suggests 302 a playlist of results to the user. The results and image(s) can also be stored in an annotated image database 108 for future retrieval and viewing.

While the preferred embodiments of the present invention have been illustrated and described, it will be understood by those skilled in the art that the system, apparatus and method as described herein are illustrative and various changes and modifications may be made and equivalents may be substituted for elements thereof without departing from the true scope of the present invention. In addition, many modifications may be made to adapt the teachings of the present invention to a particular image playback w/sound/sound-effects set-up without departing from its central scope. Therefore, it is intended that the present invention not be limited to the particular embodiments disclosed as the best mode contemplated for carrying out the present invention, but that the present invention include all embodiments falling within the scope of the appended claims.

The invention claimed is:

1. A method for using content metadata associated with a sequence of at least one image to provide audio accompaniment therefor, comprising the steps of:
   accepting said sequence of at least one image and associated content metadata,
   locating matching audio accompaniment metadata in an audio accompaniment database using the content metadata associated with the sequence; and
   compiling the located audio accompaniment metadata into a play list associated with the sequence; and
   deriving a degree of match between the located audio accompaniment metadata and the content metadata;
   playing or presenting the compiled playlist in a ranked order of compiled audio accompaniment according to the derived degree of matching while the at least one image is displayed;
   providing the located audio accompaniment as accompaniment for the sequence, wherein, for said matching, the content metadata used to locate the matching audio accompaniment metadata comprises a keyphrase and the database is keyphrase indexed.

2. The method of claim 1, wherein content metadata further comprises at least one of: date, time, event, location, relationship of image to user, user characteristics.

3. The method of claim 1, further comprising the steps of:
   providing a thesaurus of standard content metadata and synonyms thereof; and
   using the thesaurus to normalize content metadata associated with the sequence to the standard content metadata.

4. The method of claim 3, wherein content metadata further comprises at least one of: date, time, event, location, relationship of image to user.

5. The method of claim 1, further comprising the step of associating the content metadata with the sequence by a technique selected from the group consisting of assignment of a metadata descriptor and derivation of a metadata descriptor by content analysis of the at least one image.

6. The method of claim 5, wherein content analysis is selected from the group consisting of optical character recognition of text, image scene recognition, and image object recognition.

7. The method of claim 5, wherein the providing step further comprises first performing the step of:
   including any selection made from the compiled playlist in the located audio accompaniment.

8. The method of claim 7, further comprising the steps of:
   retaining the sequence and the located audio accompaniment therefor, in a short-term persistent memory; and
   prior to the providing step, retrieving the retained sequence and the located audio accompaniment therefor.

9. The method of claim 8, wherein content metadata further comprises at least one of: user data, date, time, event, location, relationship of image to user, name of individual in the image, name of pet in the image, image title, season, temperature, latitude, longitude, size, body part, color.

10. The method of claim 9, further comprising the steps of:
    providing a thesaurus of standard content metadata and synonyms thereof; and using the thesaurus to normalize content metadata associated with the sequence to the standard content metadata.

11. The method of claim 10, wherein the providing step further comprises the steps of:
storing the sequence associated with the located audio accompaniment in a database; and
retrieving the stored sequence and associated audio accompaniment from the database.

12. An apparatus that associates audio accompaniment with a sequence of at least one image having a content for simultaneous presentation therewith, said apparatus comprising distinct software modules embodied on a computer readable medium, wherein the distinct software modules comprise:
at least one processor;
an image/metadata capture/creation module,
an audio accompaniment metadata search/association module,
an audio accompaniment suggestion/play module and
an image sequence display module:
wherein said image/metadata capture/creation module is configured to capture the sequence and to capture and create metadata describing the content of the at least one image
wherein said audio accompaniment metadata search/association module searches an audio accompaniment database for matching audio accompaniment using the associated metadata as search criteria, wherein, for said matching, the content metadata comprises a keyphrase and the database is keyphrase indexed;
wherein said audio accompaniment suggestion/play module suggests a playlist of audio accompaniments resulting from the search by playing or presenting the compiled playlist in a ranked order of compiled audio accompaniment according to the derived degree of matching while the at least one image is displayed; and
wherein said image sequence display module simultaneously displays the sequence when the audio accompaniment suggestion/play module plays an audio accompaniment resulting from the search.

13. The apparatus of claim 12, further comprising:
a database;
wherein, the image/metadata capture/creation module and the audio accompaniment metadata search/association module are each further configured to store the sequence, metadata and located audio accompaniment in the database; and
wherein, the audio accompaniment suggestion/play module and the image-sequence display module are each further configured to retrieve a sequence and associated metadata from the database for simultaneous display and play thereof.

14. The apparatus of claim 12, wherein the image/metadata capture/creation module is further configured to create metadata using image content analysis techniques.

15. The apparatus of claim 14, wherein the image content analysis techniques are selected from the group consisting of optical character recognition of text, image scene recognition, image object recognition.

16. A system for audio accompaniment of a sequence of at least one digital image, comprising:
a display device;
an audio accompaniment play device; and
an apparatus according to claim 15 operably connected to the display device and the audio play device,
wherein, the apparatus accepts a sequence of at least one image and first image metadata, derives second image metadata using content analysis techniques, locates appropriate audio accompaniment using the first and second metadata and then one of plays the audio accompaniment while displaying the sequence or suggests a playlist of results to a user.

* * * * *